Patented Oct. 7, 1952

2,613,211

UNITED STATES PATENT OFFICE 2,613,211

IMIDAZOLIDINETHIONES

Melvin D. Hurwitz, Philadelphia, and Robert W. Auten, Jenkintown, Pa., assignors to Rohm & Haas Company, Philadelphia, Pa., a corporation of Delaware No Drawing. Application October 26, 1950, Serial No. 192,350

4 Claims. (Cl. 260—309.7)

This invention concerns 2-imidazolidinethiones having on a ring nitrogen an aminoethyl grouping. This invention also deals with a process by which these compounds are prepared.

According to this process a dialkylenetriamine having a chain of two carbon atoms between nitrogens is reacted with carbon bisulfide with elimination of hydrogen sulfide by heating the two reactants together at temperatures from 30° to 250° C. The reaction is usually initiated at 0° to 50° C. and continued by raising the temperature above 200° C. thus completing the reaction and ensuring elimination of hydrogen sulfide and any other volatile products. Such temperatures also cause decomposition of thiocarbamates and like compounds which may form as intermediates.

The amines which can be thus reacted with carbon bisulfide are diethylenetriamine, dipropylenetriamine, and the N-methyl derivatives thereof. These di-1,2-alkylenetriamines may be summarized by the formula

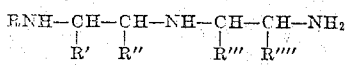

where the various R substituents represent hydrogen or the methyl group with the proviso that at least one member of the pair R' and R" and of the pair R''' and R'''' is hydrogen.

The following examples supply more details of typical preparations of imidazolidinethiones according to the process of this invention.

Example 1

A reaction vessel equipped with stirrer and reflux condenser was charged with 650 parts by weight of diethylenetriamine and thereto was slowly added carbon bisulfide. The vessel was cooled with an ice-acetone mixture during the addition. When about 350 parts of carbon bisulfide had been added, the reaction mixture became too viscous for stirring. Addition was continued, however, until 456 parts by weight had been introduced. The mixture was heated, care being taken to trap any carbon bisulfide vapors. Soon decomposition became rapid and steam was passed through the condenser jacket to prevent clogging. The hydrogen sulfide evolved was flushed with a water jet. As the temperature of the reaction mixture was increased, there were changes in color from a clear yellow at 110° to a light green at 120° to a deep blue-green at 165° to a light yellow at 180° C. Heating was discontinued at 200°-210° C. Color changes in reverse from the above took place when the reaction mixture was cooled. At 96° C. it solidified. The product was taken up by heating it with 560 parts of ethanol containing benzene. The solution was filtered and crystals were obtained. The main fraction amounted to 610 parts melting at 111°-112° C. An additional 106 parts of product was obtained from the mother liquor. The combined products melted at 110°-112° C. and had a neutral equivalent of 145. This was an 82% yield of

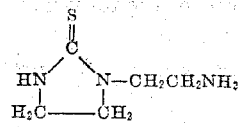

Example 2

In accordance with the method used in Example 1 there was charged to the reaction vessel 262 parts of dipropylenetriamine and 135 parts of carbon bisulfide was slowly added. Hydrogen sulfide was evolved as the mixture was heated. The temperature was carried above 200° C. and the vessel evacuated to 100 mm. pressure for 10 minutes. The reaction mixture was cooled and washed with acetone and water to remove any unreacted amine. The product was a yellow solid which corresponded in composition to

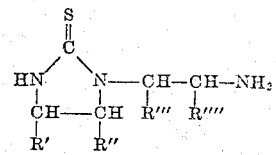

where one of each pair of R'—R" and R'''—R'''' is methyl and the other hydrogen. The product appears to be a mixture of isomers.

Example 3

There was placed in the reaction vessel 117 parts of N-(beta-methylaminoethyl)ethylenediamine and 75 parts of carbon bisulfide was slowly added and mixed therewith. These materials reacted and were heated, the excess carbon bisulfide being distilled out and the temperature of the reaction mixture being carried to over 200° C. and then cooled. The product was washed with alcohol and a crystalline solid obtained which contained 20.3% of sulfur and 26.3% of nitrogen, corresponding in composition to N-methyl-N'-beta-aminoethyl-2-imidazolidinethione, for which theoretical values are 20.1% and 26.4% for sulfur and nitrogen respectively. This compound may also be called 1-methyl-3-beta-aminoethyl-2-imidazolidinethione.

The beta-aminoethyl-2-imidazolidinethiones, which may be represented by the formula

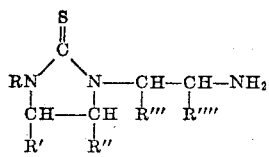

can be reacted with thiourea or urea to give thioureido- or ureido-ethyl derivatives, when an above compound and thiourea or urea are heated together up to about 200°–250° C. or more in equimolar proportions. When two moles of one of the above compounds is thus heated with a mole of thiourea or urea, there results a bis-(thionoimidazolidylethyl) thiourea or urea.

These various compounds react with formaldehyde to give methylol compounds and condensates which are useful in the treatment of cellulosic products, including textiles. There may also be obtained resinous products which find use in coatings, laminations, etc. In such fields of application the N-alkoxymethyl derivatives are of particular interest. The compounds of this invention are useful as intermediates for preparing fungicides and insecticides.

We claim:

1. A process for preparing imidazolidinethiones which comprises reacting together carbon bisulfide and an amine of the formula

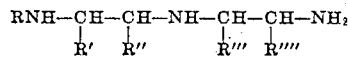

and heating the reaction mixture to a temperature between 200° and 250° C., in the above formula the R substituents representing at least one member of the class consisting of hydrogen and the methyl group with the requirement that of the pair R' and R'' and of the pair R''' and R'''' at least one of the substituents is hydrogen.

2. A process for preparing N-beta-aminoethyl-2-imidazolidinethione which comprises reacting together carbon bisulfide and diethylenetriamine and heating the reaction mixture to a temperature between 200° and 250° C.

3. As new chemical substances, compounds of the formula

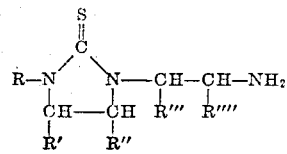

wherein the R substituents represent members of the class consisting of hydrogen and the methyl group with the requirement that of the pair R' and R'' and of the pair R''' and R'''' at least one of the substituents is hydrogen.

4. As a new chemical compound, 1-(beta-aminoethyl)-2-imidazolidinethione.

MELVIN D. HURWITZ.
ROBERT W. AUTEN.

No references cited.